United States Patent
Xie et al.

(10) Patent No.: US 12,092,614 B2
(45) Date of Patent: Sep. 17, 2024

(54) ULTRASONIC-RESILIENCE VALUE TESTING APPARATUS FOR INORGANIC NON-METAL PLATE

(71) Applicants: DONGGUAN CITY WONDERFUL CERAMICS INDUSTRIAL PARK CO., LTD., Dongguan (CN); JIANGXI HEMEI CERAMICS CO., LTD., Yichun (CN); GUANGDONG JIAMEI CERAMICS CO., LTD, Qingyuan (CN)

(72) Inventors: Yuezeng Xie, Dongguan (CN); Jianping Huang, Dongguan (CN); Kehui Lin, Dongguan (CN); Hailong Yu, Dongguan (CN); Zhongmin Li, Dongguan (CN)

(73) Assignees: DONGGUAN CITY WONDERFUL CERAMICS INDUSTRIAL PARK CO., LTD., Dongguan (CN); JIANGXI HEMEI CERAMICS CO., LTD., Yichun (CN); GUANGDONG JIAMEI CERAMICS CO., LTD, Qingyuan (CN)

(*) Notice: Subject to any disclaimer, the term of this patent is extended or adjusted under 35 U.S.C. 154(b) by 412 days.

(21) Appl. No.: 17/421,110

(22) PCT Filed: Mar. 18, 2020

(86) PCT No.: PCT/CN2020/079838
§ 371 (c)(1),
(2) Date: Jul. 7, 2021

(87) PCT Pub. No.: WO2021/184230
PCT Pub. Date: Sep. 23, 2021

(65) Prior Publication Data
US 2022/0341883 A1      Oct. 27, 2022

(51) Int. Cl.
*G01N 29/265* (2006.01)
*G01N 29/04* (2006.01)

(52) U.S. Cl.
CPC .......... *G01N 29/265* (2013.01); *G01N 29/04* (2013.01)

(58) Field of Classification Search
CPC ................. G01N 3/00; G01N 3/40–44; G01N 29/04–12; G01N 29/223; G01N 29/225; G01N 29/265
See application file for complete search history.

(56) References Cited

U.S. PATENT DOCUMENTS 4,852,397 A * 8/1989 Haggag ..................... G01N 3/42
                                                                73/82
6,962,083 B2 * 11/2005 Gripp ................... G01N 29/265
                                                                901/44
(Continued)

FOREIGN PATENT DOCUMENTS

CN      201666859 U    * 12/2010
CN      201819901 U      5/2011
(Continued)

OTHER PUBLICATIONS

CN-107144529-B translation (Year: 2019).*
(Continued)

*Primary Examiner* — Justin N Olamit
(74) *Attorney, Agent, or Firm* — Maier & Maier, PLLC

(57) ABSTRACT

An ultrasonic-resilience value testing apparatus for an inorganic non-metal plate, including: a fixing mechanism, a testing mechanism and a control mechanism. The fixing mechanism is for carrying and fixing an inorganic non-metal plate to be tested; the testing mechanism is for performing ultrasonic-resilience value testing on the inorganic non-metal plate fixed on the fixing mechanism; and the control mechanism is in communication connection to the fixing (Continued)

mechanism and the testing mechanism, and is for controlling the fixing mechanism and the testing mechanism to run. By setting the fixing mechanism, problems such as slipping, angle deviation, vibration or movement and damage to the test sample are avoided. By setting the testing mechanism for the resilience value testing, the phenomenon that the relevant mechanical properties of the test sample cannot be accurately reflected since a resilience angle, a velocity and the like are affected by human factors, is improved.

5 Claims, 2 Drawing Sheets

(56) References Cited

U.S. PATENT DOCUMENTS

| | | | | |
|---|---|---|---|---|
| 10,125,463 | B2 * | 11/2018 | Hamling | E02B 11/005 |
| 10,184,865 | B2 * | 1/2019 | Sakuma | G01N 3/42 |
| 11,054,350 | B2 * | 7/2021 | Roszman | G01N 3/02 |

FOREIGN PATENT DOCUMENTS

| | | | | | |
|---|---|---|---|---|---|
| CN | 207351799 | U | | 5/2018 | |
| CN | 209014518 | U | * | 6/2019 | |
| CN | 209446527 | U | | 9/2019 | |
| CN | 107144529 | B | * | 10/2019 | G01N 21/01 |
| CN | 111220707 | A | | 6/2020 | |
| DE | 102005010317 | B3 | * | 8/2006 | G01N 29/225 |
| JP | S6326546 | A | | 2/1988 | |
| JP | H07260747 | A | | 10/1995 | |
| JP | 2007-333498 | A | | 12/2007 | |
| JP | 2013-054020 | A | | 3/2013 | |
| JP | 2019-007869 | A | | 1/2019 | |

OTHER PUBLICATIONS

Office Action dated Aug. 9, 2022, in corresponding Japanese Patent Application No. 2021-542564, 5 pages.

International Search Report issued on Dec. 21, 2020 in corresponding International application No. PCT/CN2020/079838; 3 pages.

* cited by examiner

ULTRASONIC-RESILIENCE VALUE TESTING APPARATUS FOR INORGANIC NON-METAL PLATE

TECHNICAL FIELD

The present disclosure relates to the technical field of inorganic non-metal testing, and particularly relates to an ultrasonic-resilience value testing apparatus for an inorganic non-metal plate.

BACKGROUND

In the prior art, the characterization of the mechanical properties (such as the compressive strength, the flexural strength, and the elastic modulus) of an inorganic non-metal sheet is currently mainly performed by destructive testing measures or methods, causing unnecessary damage to a test sample.

For the above problems, an ultrasonic-resilience two-parameter testing technology has emerged. However, the existing ultrasonic-resilience two-parameter testing technology requires a resiliometer to be manually operated during resilience testing of an inorganic non-metal plate, which will cause the problem that a resilience angle, a velocity and the like are greatly affected by human factors, and a material may vibrate or move to disperse the resilience energy. As a result, the resilience testing cannot be completed or testing data is inaccurate, so that the relevant mechanical properties of the test sample cannot be accurately reflected. In addition, an ultrasonic testing technology is a non-destructive testing measure for testing the surface and internal quality of a component. However, due to the limitation to the size of an ultrasonic probe, ultrasonic testing waveforms are unstable and testing data has a large deviation under the influence of a contact area, an angle and the like during testing for platy ceramic.

Therefore, the prior art has defects and needs to be improved and developed.

SUMMARY

The technical problem to be solved by the present disclosure is that for the defects in the prior art, an ultrasonic-resilience value testing apparatus for an inorganic non-metal plate, which aims to solve the problem that a resiliometer needs to be manually operated during testing of an inorganic non-metal plate, which easily causes inaccuracy of testing data.

The technical solution used by the present disclosure to solve the technical problems is as follows: an ultrasonic-resilience value testing apparatus for an inorganic non-metal plate, including:

a fixing mechanism, a testing mechanism and a control mechanism.

The fixing mechanism is used for carrying and fixing an inorganic non-metal plate to be tested;

the testing mechanism is used for performing ultrasonic-resilience value testing on the inorganic non-metal plate fixed on the fixing mechanism;

the control mechanism is in communication connection to the fixing mechanism and the testing mechanism, and is used for controlling the fixing mechanism and the testing mechanism to run.

Further, the fixing mechanism includes a rotary lifting platform and a fixed cylinder component; the fixed cylinder component is arranged at the upper end of the rotary lifting platform, the rotary lifting platform and the fixed cylinder component can move towards each other;

the rotary lifting platform is liftable and rotatable, and is used for carrying the inorganic non-metal plate to be tested;

the fixed cylinder component is connected with a cylinder and used for pressing and fixing the inorganic non-metal plate on the rotary lifting table. Further, the fixing mechanism further includes an experiment module; the rotary lifting platform is fixed at the bottom of the experiment module; and the fixed cylinder component is mounted at the top of the experiment module.

Further, a scaleplate is arranged on a side surface of the rotary lifting platform, and a detachable inorganic non-metal cushion block is arranged on an upper surface of the rotary lifting platform;

the fixed cylinder component includes a first fixed cylinder component, a second fixed cylinder component and a third fixed cylinder component which are disposed in parallel.

Further, the testing mechanism includes an ultrasonic testing component;

the ultrasonic testing component includes an ultrasonic transmitter, an ultrasonic receiver, a first ultrasonic cylinder and a second ultrasonic cylinder; the ultrasonic transmitter is fixed on the first ultrasonic cylinder; and the ultrasonic receiver is fixed on the second ultrasonic cylinder.

Further, the first ultrasonic cylinder and the second ultrasonic cylinder are fixed on the left and right side walls of the experiment module, with centers located on the same straight line;

the first ultrasonic cylinder and the second ultrasonic cylinder are used for driving the ultrasonic transmitter and the ultrasonic receiver to move towards each other, and driving the ultrasonic transmitter and the ultrasonic receiver to move along a vertical direction.

Further, the resilience testing component further includes a resilience testing component;

the resilience testing component includes a resiliometer, a data acquirer and a crossed positioning sliding table;

the resiliometer is arranged on the crossed positioning sliding table, and is in communication connection to the data acquirer;

the crossed positioning sliding table is arranged at the front upper end of the second ultrasonic cylinder, and is used for driving the resiliometer to move in a horizontal direction and a vertical direction.

Further, the control mechanism is arranged on one side of the experiment module; the control mechanism includes a control module used for controlling pressure and on-off of an air pump and on-off of the cylinders, and a data processing module used for collecting testing data of the ultrasonic testing component and the resilience testing component and outputting test results.

Another technical solution used by the present disclosure to solve the technical problems is as follows: an ultrasonic-resilience value testing method for an inorganic non-metal plate, including:

Step S100, the control mechanism receiving a corresponding size instruction of an inorganic non-metal plate to be tested, replacing an inorganic non-metal cushion block of a corresponding size, controlling the rotary lifting platform to rise up and drop down after the inorganic non-metal plate to be tested is horizontally placed on the rotary lifting platform to cause the inorganic non-metal plate to be located on the same horizontal line with the first ultrasonic cylinder and the second ultrasonic cylinder, and controlling the fixed cylinder component to press the inorganic non-metal plate to be tested;

Step S200, controlling the first ultrasonic cylinder to drive the ultrasonic transmitter, controlling the second ultrasonic cylinder to drive the ultrasonic receiver to be aligned with a position of a center point of a side edge of the inorganic non-metal plate to be tested in a thickness direction, and controlling the ultrasonic transmitter and the ultrasonic receiver to start to perform testing and collect ultrasonic testing data;

Step S300, turning off the cylinders to cause the fixed cylinder component, the first ultrasonic cylinder and the second ultrasonic cylinder to be reset, controlling the rotary lifting platform to rise up to cause the side surface of the inorganic non-metal plate to be tested to be located on the same plane with the resiliometer, and controlling the fixed cylinder component to press the inorganic non-metal plate to be tested;

Step S400, controlling the resiliometer to perform resilience testing on the center position of the side surface of the inorganic non-metal plate to be tested according to a preset rule and collect resilience value testing data, and to return to the original position after the testing is completed, and controlling the crossed positioning sliding table to drive the resiliometer to move to a next point to be tested till the testing for the side surface is completed;

Step S500, after the testing is completed, controlling the fixed cylinder component to be reset, controlling the rotary lifting platform to rotate 90°, and controlling the fixed cylinder component to press the inorganic non-metal plate to be tested;

Step S600, repeating the step S400 and the step S500 till resilience value testing data of four side surfaces of the inorganic non-metal plate is obtained;

Step S700, the data processing module in the control mechanism obtaining ultrasonic testing data and resilience value testing data, obtaining an ultrasonic data effective value and a resilience value effective value by means of data processing, and obtaining a mechanical property reference value of the inorganic non-metal plate by means of conversion.

A further technical solution adopted by the present disclosure to solve the technical problems is as follows: a storage medium. The storage medium stores a computer program which can be executed to implement the above-mentioned ultrasonic-resilience value testing method for an inorganic non-metal plate.

Beneficial effects: According to the ultrasonic-resilience value testing apparatus and method for the inorganic non-metal plate, and the storage medium, the ultrasonic-resilience value testing apparatus for the inorganic non-metal plate includes the fixing mechanism, the testing mechanism and the control mechanism; the fixing mechanism is used for carrying and fixing the inorganic non-metal plate to be tested; the testing mechanism is used for performing ultrasonic-resilience value testing on the inorganic non-metal plate fixed on the fixing mechanism; and the control mechanism is in communication connection with the fixing mechanism and the testing mechanism, and is used for controlling the fixing mechanism and the testing mechanism to run. It can be understood that according to the ultrasonic-resilience value testing apparatus for the inorganic non-metal plate provided by the present disclosure, the fixing mechanism and the testing mechanism can be effectively controlled by means of the control mechanism, thus realizing automatic testing for the inorganic non-metal plate. By setting the fixing mechanism to fix the inorganic non-metal plate to be tested, phenomena such as slipping and angle deviation will not occur in the ultrasonic testing and resilience testing processes, the material will not vibrate or move, and corner positions of the inorganic non-metal plate to be tested cannot be damaged to affect reuse of the material. By setting the testing mechanism for the resilience value testing, the problem that a resilience angle, a velocity and the like are greatly affected by human factors is avoided, the problem that the relevant mechanical properties of the test sample cannot be accurately reflected because the ultrasonic testing and the resilience testing fail in completion or the testing data is inaccurate is avoided, and the accuracy of the ultrasonic testing and the resilience testing is improved. By setting the control mechanism to automatically control the transportation fixing mechanism and the testing mechanism, the testing efficiency is improved.

DETAILED DESCRIPTION OF THE EMBODIMENTS

To make the objectives, technical solutions and advantages of the present disclosure clearer, the present disclosure is further described below in detail with reference to accompanying drawings and embodiments. It should be understood that the specific embodiments described here are merely to explain the present disclosure, and not intended to limit the present disclosure.

At present, the characterization of the mechanical properties (such as the compressive strength, the flexural strength, and the elastic modulus) of an inorganic non-metal sheet is currently mainly performed by destructive testing measures or methods, causing unnecessary damage to a test sample. Moreover, for the above problems, an ultrasonic-resilience two-parameter testing technology has emerged. However, the existing ultrasonic-resilience two-parameter testing technology requires a resiliometer to be manually operated during resilience testing of an inorganic non-metal plate, which will cause the problem that a resilience angle, a velocity and the like are greatly affected by human factors, and a material may vibrate or move to disperse the resilience energy. As a result, the resilience testing cannot be completed or testing data is inaccurate and cannot accurately reflect the relevant mechanical properties of the test sample. In addition, an ultrasonic testing technology is a non-destructive testing measure for testing the surface and internal quality of a component. However, due to the limitation to the size of an ultrasonic probe, ultrasonic testing waveforms are unstable and testing data has a large deviation under the influence of a contact area, an angle and the like during testing for platy ceramic.

According to the ultrasonic-resilience value testing apparatus for the inorganic non-metal plate provided by the present disclosure based on the above-mentioned technical problems, by setting a fixing mechanism to fix an inorganic non-metal plate to be tested, phenomena such as slipping and angle deviation will not occur in a resilience testing process, the material will not vibrate or move, and corner positions of the inorganic non-metal plate to be tested cannot be damaged to affect reuse of the material; by setting a testing mechanism for the resilience value testing, the problem that a resilience angle, a velocity and the like are greatly affected by human factors is avoided, the problem that the relevant mechanical properties of the test sample cannot be accurately reflected because the ultrasonic testing and the resilience testing fail in completion or the testing data is inaccurate is avoided, and the accuracy of the ultrasonic testing and the resilience testing is improved; and by setting a control mechanism to automatically control the transportation fixing mechanism and the testing mechanism, the testing efficiency is improved.

Figure 1:
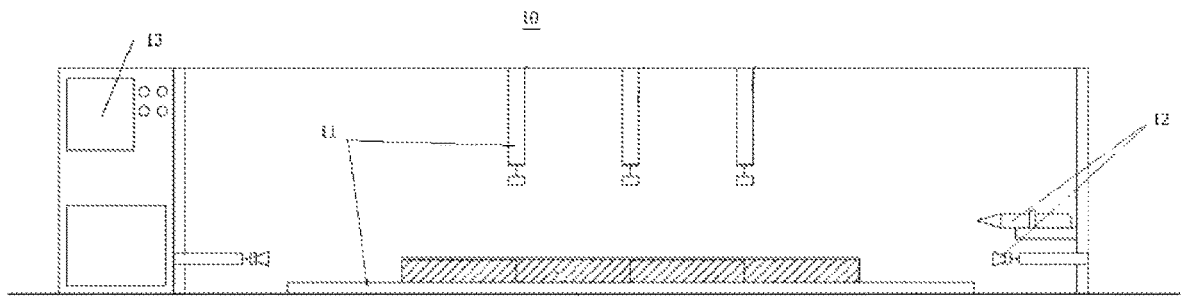
FIG. 1 is a front view of a preferred embodiment of an ultrasonic-resilience value testing apparatus for an inorganic non-metal plate in the present disclosure.
Figure 2:
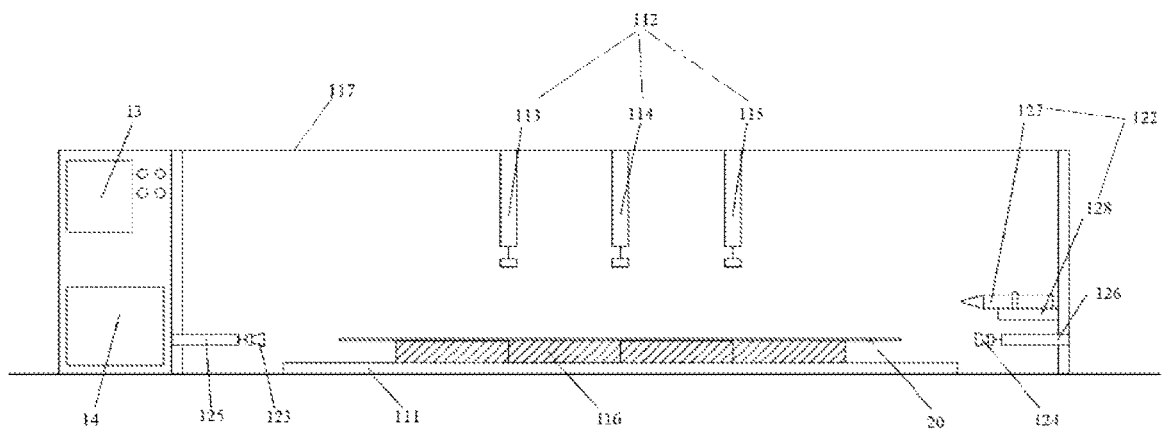
FIG. 2 is a front view of a preferred embodiment of an ultrasonic-resilience value testing apparatus for an inorganic non-metal plate in the present disclosure.

Referring to FIG. 1 and FIG. 2 in combination, the first embodiment of the present disclosure provides an ultrasonic-resilience value testing apparatus 10 for an inorganic non-metal plate, including a fixing mechanism 11, a testing mechanism 12 and a control mechanism. The fixing mechanism 11 is used for carrying and fixing an inorganic non-metal plate to be tested 20; the testing mechanism 12 is used for performing ultrasonic-resilience value testing on the inorganic non-metal plate 20 fixed on the fixing mechanism 11; the control mechanism 13 is in communication connection to the fixing mechanism 11 and the testing mechanism 12, and is used for controlling the fixing mechanism 11 and the testing mechanism 12 to run.

It can be understood that according to the ultrasonic-resilience value testing apparatus 10 for the inorganic non-metal plate provided by the present disclosure, the fixing mechanism 11 and the testing mechanism 12 can be effectively controlled by means of the control mechanism 13, thus realizing automatic testing for the inorganic non-metal plate 20. By setting the fixing mechanism 11 to fix the inorganic non-metal plate to be tested 20, phenomena such as slipping and angle deviation will not occur in the ultrasonic testing and resilience testing processes, the material will not vibrate or move, and corner positions of the inorganic non-metal plate to be tested 20 cannot be damaged to affect reuse of the material. By setting the testing mechanism 12 for the resilience value testing, the problem that a resilience angle, a velocity and the like are greatly affected by human factors is avoided, the problem that the relevant mechanical properties of the test sample cannot be accurately reflected because the ultrasonic testing and the resilience testing fail in completion or the testing data is inaccurate is avoided, and the accuracy of the ultrasonic testing and the resilience testing is improved. By setting the control mechanism 13 to automatically control the transportation fixing mechanism 11 and the testing mechanism 12, the testing efficiency is improved.

In some preferred embodiments, the fixing mechanism 11 includes a rotary lifting platform 111 and a fixed cylinder component 112. The fixed cylinder component 112 is arranged at the upper end of the rotary lifting platform 111, the rotary lifting platform 111 and the fixed cylinder component 112 can move towards each other; the rotary lifting platform 111 is liftable and rotatable, and is used for carrying the inorganic non-metal plate to be tested 20; the fixed cylinder component 112 is connected with a cylinder and used for pressing and fixing the inorganic non-metal plate 20 on the rotary lifting table 111.

It can be understood that the fixing mechanism 11 of the ultrasonic-resilience value testing apparatus 10 for the inorganic non-metal plate in the present disclosure is used for carrying the rotary lifting platform 111 of the inorganic non-metal plate to be tested 20 for selection, installation and lifting, thus realizing ultrasonic testing and resilience value testing for the inorganic non-metal plate to be tested 20 at different angles. The fixed cylinder component 112 is arranged at the upper end of the rotary lifting platform 111 in a perpendicular direction; the fixed cylinder component 112 may get close to and away from the rotary lifting platform 111 to realize pressing and fixing of the inorganic non-metal plate to be tested 20 on the rotary lifting platform 111, so that the phenomena such as slipping and angle deviation in the resilience testing process is effectively avoided, the material will not vibrate or move, and corner positions of the inorganic non-metal plate to be tested 20 cannot be damaged to affect reuse of the material. By setting the testing mechanism 12 for the resilience value testing, the problem that a resilience angle, a velocity and the like are greatly affected by human factors is avoided, the problem that the relevant mechanical properties of the test sample cannot be accurately reflected because the resilience testing fails in completion or the testing data is inaccurate is avoided, and the accuracy of the resilience value testing is improved.

Further, the fixing mechanism 11 further includes an experiment module 117; the rotary lifting platform 111 is fixed at the bottom of the experiment module 117; and the fixed cylinder component 112 is mounted at the top of the experiment module 117.

It can be understood that the experiment module 117 has a bottom and a top on the horizontal plane, and the top is located at the relative upper end of the bottom; a side wall is connected between the bottom and the top; the rotary lifting platform 111 is arranged in the middle of the bottom of the experiment module 117; the fixed cylinder component 112 is arranged in the middle of the top of the experiment module 117. By setting the experiment module 117, the interference of environmental factors to the accuracy of the testing data is effectively avoided.

In some preferred embodiments, a scaleplate is arranged on a side surface of the rotary lifting platform 111; a detachable inorganic non-metal cushion block 116 is arranged on an upper surface of the rotary lifting platform 111; and the fixed cylinder component 112 includes a first fixed cylinder component 113, a second fixed cylinder component 114 and a third fixed cylinder component 115 which are disposed in parallel.

It can be understood that by setting the scaleplate, the height of the rotary lifting platform 111 is effectively and conveniently adjusted, that is, the height of the inorganic non-metal plate to be tested 20 is convenient to adjust. By setting the inorganic non-metal cushion block 116, the inorganic non-metal plate to be tested 20 is facilitated, and the fixing strength of the rotary lifting platform 111 to the inorganic non-metal plate to be tested 20 is also improved; meanwhile, the inorganic non-metal cushion block 116 is detachable, so that the inorganic non-metal cushion block 116 of a corresponding size is conveniently replaced according to the size of the inorganic non-metal plate to be tested 20; moreover, a plurality of fixed cylinder components 112 are provided, so that multi-point fixing and multi-point pressing for the inorganic non-metal plate to be tested are realized, and the fixing stability of the fixing mechanism 11 for the inorganic non-metal plate to be tested 20 is improved.

In some preferred embodiments, the testing mechanism 12 includes an ultrasonic testing component; the ultrasonic testing component includes an ultrasonic transmitter 123, an ultrasonic receiver 124, a first ultrasonic cylinder 125 and a second ultrasonic cylinder 126; the ultrasonic transmitter 123 is fixed on the first ultrasonic cylinder 125; and the ultrasonic receiver 124 is fixed on the second ultrasonic cylinder 126.

Further, the first ultrasonic cylinder 125 and the second ultrasonic cylinder 126 are fixed on the left and right side walls of the experiment module 117, with their centers located on the same straight line; the first ultrasonic cylinder 125 and the second ultrasonic cylinder 126 are used for driving the ultrasonic transmitter 123 and the ultrasonic receiver 124 to move towards each other, and driving the ultrasonic transmitter 123 and the ultrasonic receiver 124 to move along a vertical direction.

It can be understood that by setting the ultrasonic testing component, the inorganic non-metal plate 20 is subjected to ultrasonic non-destructive testing; moreover, the ultrasonic transmitter 123 is arranged on the first ultrasonic cylinder 125; the ultrasonic receiver 124 is arranged on the second ultrasonic cylinder 126; the first ultrasonic cylinder 125, the second ultrasonic cylinder 126, the ultrasonic transmitter 123 and the ultrasonic receiver 124 are arranged on the same horizontal plane, so that it is ensured to accurately testing the relevant ultrasonic testing data of the inorganic non-metal plate to be tested 20.

In some other preferred embodiments, the resilience testing component includes a resiliometer 127, a data acquirer and a crossed positioning sliding table 128; the resiliometer 127 is arranged on the crossed positioning sliding table 128, and is in communication connection to the data acquirer; the crossed positioning sliding table 128 is arranged at the front upper end of the second ultrasonic cylinder 126, and is used for driving the resiliometer to move in a horizontal direction and a vertical direction.

Further, the resiliometer 127 is arranged on the crossed positioning sliding table 128 to realize that the position of the resiliometer 127 relative to the inorganic non-metal plate to be tested 20 is convenient to adjust; the crossed positioning sliding table 128 moves in the horizontal direction or the perpendicular direction to adjust the position of the crossed positioning sliding table 128 relative to the inorganic non-metal plate to be tested 20; and moreover, by setting the crossed positioning sliding table 128, it is effectively ensured that the resiliometer 127 has no additional problems, such as vibration, displacement and angle, to interfere with accurate testing of a resilience value during testing for the inorganic non-metal plate 20.

In some other preferred embodiments, the control mechanism 13 is arranged on one side of the experiment module 117; the control mechanism 13 includes a control module used for controlling pressure and on-off of an air pump and on-off of the cylinders, and a data processing module used for collecting testing data of the ultrasonic testing component and the resilience testing component and outputting test results. Further, the testing results include a resilience value, ultrasonic testing data and mechanical property reference result.

Figure 3:
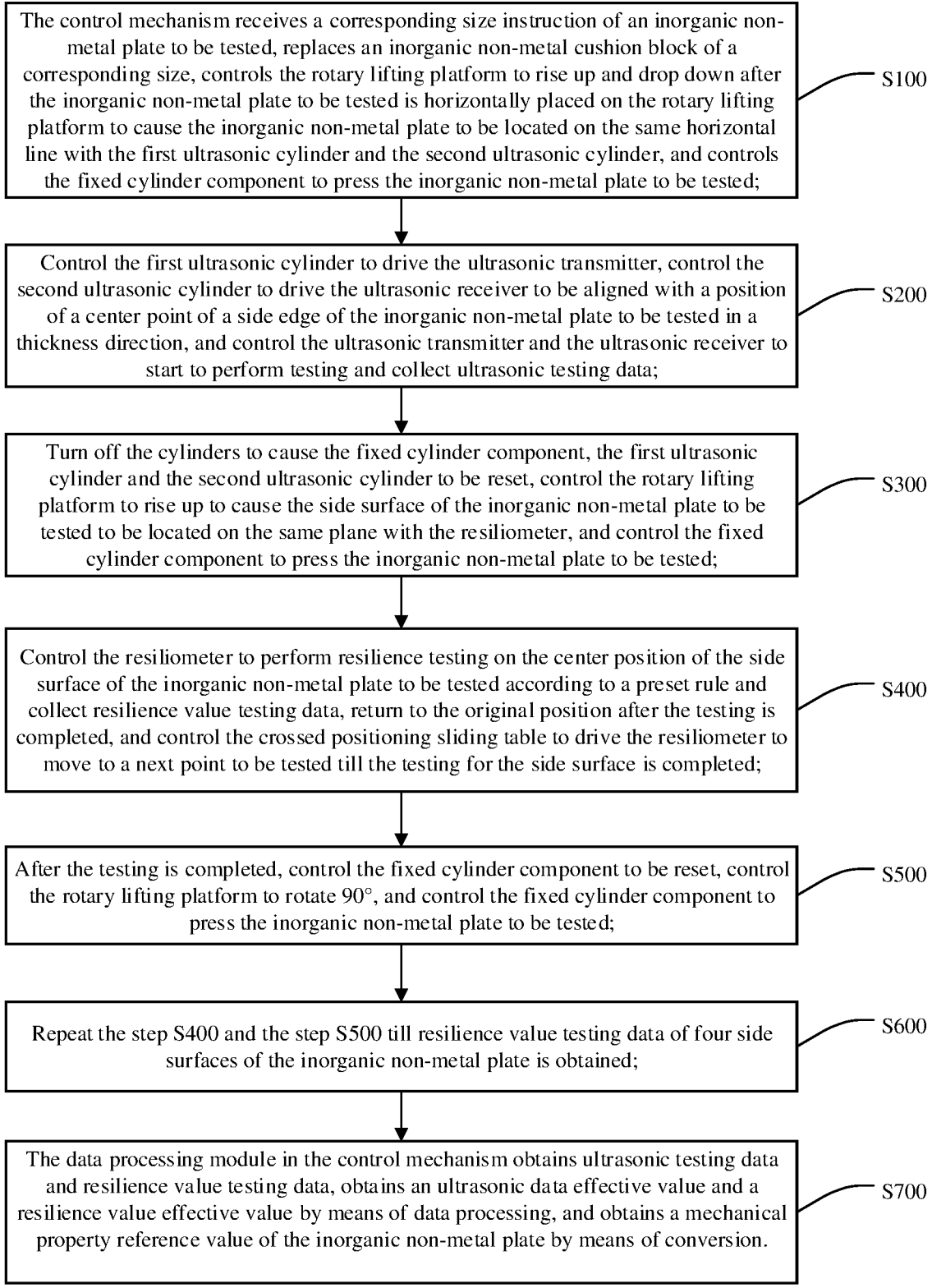
FIG. 3 is a flow diagram of a preferred embodiment of an ultrasonic-resilience value testing method for an inorganic non-metal plate in the present disclosure.

Referring to FIG. 3 in combination, the second embodiment of the present disclosure provides an ultrasonic-resilience value testing method for an inorganic non-metal plate, including:

Step S100, the control mechanism 13 receives a corresponding size instruction of an inorganic non-metal plate to be tested 20, replaces an inorganic non-metal cushion block 116 of a corresponding size, controls the rotary lifting platform 111 to rise up and drop down after the inorganic non-metal plate to be tested 20 is horizontally placed on the rotary lifting platform 111 to cause the inorganic non-metal plate 20 to be located on the same horizontal line with the first ultrasonic cylinder 125 and the second ultrasonic cylinder 126, and controls the fixed cylinder component 112 to press the inorganic non-metal plate to be tested 20.

Specifically, the inorganic non-metal plate 20 is measured through a scaleplate, and the inorganic non-metal cushion block 116 of the corresponding size is replaced; the inorganic non-metal cushion block 116 is fixed in the center of the rotary lifting platform 111; the inorganic non-metal plate 20 is then placed on the inorganic non-metal cushion block 116 on the rotary lifting platform 111, and the rotary lifting platform 111 is controlled to rise up and drop down to adjust the height, so that two side surfaces of the inorganic non-metal plate 20, the ultrasonic transmitter 123 on the first ultrasonic cylinder 125 and the ultrasonic receiver 124 on the second ultrasonic cylinder 126 are located on the same horizontal plane; the fixed cylinder component 112 is controlled to be turned on to press the inorganic non-metal plate 20; the inorganic non-metal plate 20 is fixed effectively through the fixing mechanism 11, which greatly facilitates position adjustment for the inorganic non-metal plate to be tested 20 and the testing mechanism 12 and effectively avoids human factors and environmental factors from interfering with the stability and the accuracy of the testing mechanism 12.

Step S200, the first ultrasonic cylinder 125 is controlled to drive the ultrasonic transmitter 123, and the second ultrasonic cylinder 126 is controlled to drive the ultrasonic receiver 124 to be aligned with a position of a center point of a side edge of the inorganic non-metal plate to be tested 20 in a thickness direction; and the ultrasonic transmitter 123 and the ultrasonic receiver 124 are controlled to start to perform testing and collect ultrasonic testing data;

Step S300, the cylinders are turned off to cause the fixed cylinder component 112, the first ultrasonic cylinder 125 and the second ultrasonic cylinder 126 to be reset, the rotary lifting platform 111 is controlled to rise up to cause the side surface of the inorganic non-metal plate to be tested 20 to be located on the same plane with a resiliometer 127, and the fixed cylinder component 112 is controlled to press the inorganic non-metal plate to be tested 20. It should be noted that after the fixed cylinder component 112, the first ultrasonic cylinder 125 and the second ultrasonic cylinder 126 are turned off, push rods of the fixed cylinder component 112, the first ultrasonic cylinder 125 and the second ultrasonic cylinder 126 will be reset to initial positions, i.e., where they are not in contact with the inorganic non-metal plate 20, or the ultrasonic transmitter 123 and the ultrasonic receiver 124 are in no contact with the inorganic non-metal plate 20.

Step S400, the resiliometer 127 is controlled to perform resilience testing on the center position of the side surface of the inorganic non-metal plate to be tested 20 according to a preset rule and collect resilience value testing data, and to return to the original position after the testing is completed; and the crossed positioning sliding table 128 is controlled to drive the resiliometer 127 to move to a next point to be tested till the testing for the side surface is completed.

Step S500, after the testing is completed, the fixed cylinder component 112 is controlled to be reset, the rotary lifting platform 111 is controlled to rotate 90°, and the fixed cylinder component 112 is controlled to press the inorganic non-metal plate to be tested 20.

Step S600, the step S400 and the step S500 are repeated till resilience value testing data of four side surfaces of the inorganic non-metal plate 20 is obtained.

Step S700, a data processing module in the control mechanism 13 obtains ultrasonic testing data and resilience value testing data, obtains an ultrasonic data effective value and a resilience value effective value by means of data processing, and obtains a mechanical property reference value of the inorganic non-metal plate 20 by means of conversion.

It can be understood that the control mechanism 13 can effectively control the fixing mechanism 11 and the testing mechanism 12 to realize automatic testing for the inorganic non-metal plate 20. By setting the fixing mechanism 11 to fix the inorganic non-metal plate 20, phenomena such as slipping and angle deviation will not occur in a resilience testing process, the material will not vibrate or move, and corner positions of the inorganic non-metal plate to be tested 20 cannot be damaged to affect reuse of the material; by setting the testing mechanism 12 for the resilience value testing, the problem that a resilience angle, a velocity and the like are greatly affected by human factors is avoided, the problem that the relevant mechanical properties of the test sample cannot be accurately reflected because the ultrasonic testing and the resilience testing fail in completion or the testing data is inaccurate is avoided, and the accuracy of the resilience value testing is improved; and by setting the control mechanism 13 to perform automatic control on the transportation fixing mechanism 11 and the testing mechanism 12, the testing efficiency is improved.

One embodiment is exemplified by taking a ceramic tile as a tested object. Testing steps are as follows:

Step S1, the control mechanism 13 receives a corresponding size instruction of a ceramic tile to be tested, replaces an inorganic non-metal cushion block 116 of a corresponding size, controls the rotary lifting platform 111 to rise up and drop down after the ceramic tile to be tested is horizontally placed on the rotary lifting platform 111 to cause the ceramic tile to be tested to be located on the same horizontal line with the first ultrasonic cylinder 125 and the second ultrasonic cylinder 126, and controls the fixed cylinder component 112 to press the ceramic tile to be tested.

Specifically, the ceramic tile is measured through the scaleplate, and the inorganic non-metal cushion block 116 of the corresponding size is replaced; the inorganic non-metal cushion block 116 is fixed in the center of the rotary lifting platform 111; the ceramic tile is then placed on the inorganic non-metal cushion block 116 on the rotary lifting platform 111, and the rotary lifting platform 111 is controlled to rise up and drop down to adjust the height, so that two side surfaces of the ceramic tile, the ultrasonic transmitter 123 on the first ultrasonic cylinder 125 and the ultrasonic receiver 124 on the second ultrasonic cylinder 126 are located on the same horizontal plane; the fixed cylinder component 112 is controlled to be turned on to press the ceramic tile; the ceramic tile is fixed effectively through the fixing mechanism 11, which greatly facilitates position adjustment for the ceramic tile to be tested and the testing mechanism 12 and effectively avoids human factors and environmental factors from interfering with the stability and the accuracy of the testing mechanism 12.

Step S12, the first ultrasonic cylinder 125 is controlled to drive the ultrasonic transmitter 123, and the second ultrasonic cylinder 126 is controlled to drive the ultrasonic receiver 124 to be aligned with a position of a center point of a side edge of the ceramic tile to be tested in a thickness direction; and the ultrasonic transmitter 123 and the ultrasonic receiver 124 are controlled to start to perform testing and collect ultrasonic testing data.

Specifically, the control mechanism 13 controls the pressures of the cylinders to be 0.7 MPa. The pressures of the fixed cylinder component 112, the first ultrasonic cylinder 125 and the second ultrasonic cylinder 126 are 0.7 MPa. That is to say, pressures applied by the ultrasonic transmitter 123 and the ultrasonic receiver 124 to two opposite side surfaces of the ceramic tile are 0.7 MPa.

Step S13, the cylinders are turned off, so that the fixed cylinder component 112, the first ultrasonic cylinder 125 and the second ultrasonic cylinder 126 are set; the rotary lifting platform 111 is controlled to rise up to cause the side surface of the ceramic tile to be tested to be located on the same plane with the resiliometer 127, and the fixed cylinder component 112 is controlled to press the ceramic tile to be tested.

It should be noted that after the fixed cylinder component 112, the first ultrasonic cylinder 125 and the second ultrasonic cylinder 126 are turned off, push rods of the fixed cylinder component 112, the first ultrasonic cylinder 125 and the second ultrasonic cylinder 126 will be reset to initial positions, i.e., where they are not in contact with the ceramic tile, or the ultrasonic transmitter 123 and the ultrasonic receiver 124 are in no contact with the ceramic tile.

Step S14, the resiliometer 127 is controlled to perform resilience testing on the center position of the side surface of the ceramic tile to be tested according to a preset rule and collect resilience value testing data, and to return to the original position after the testing is completed; and the crossed positioning sliding table 128 is controlled to drive the resiliometer 127 to move to a next point to be tested till the testing for the side surface is completed.

Step S15, after the testing is completed, the fixed cylinder component 112 is controlled to be reset, the rotary lifting platform 111 is controlled to rotate 90°, and the fixed cylinder component 112 is controlled to press the ceramic tile to be tested.

Step S16, the step S14 and the step S15 are repeated till resilience value testing data of four side surfaces of the ceramic tile are obtained.

Step S17, the data processing module in the control mechanism 13 obtains ultrasonic testing data and resilience value testing data, obtains an ultrasonic data effective value and a resilience value effective value by means of data processing, and obtains a mechanical property reference value of the inorganic non-metal plate by means of conversion.

According to the above, the present disclosure solves the following problems: First, the problem that a resilience angle, a velocity and the like are greatly affected by human factors because the resiliometer 127 is manually operated during traditional resilience testing is solved; and similarly, during ultrasonic testing, the repeatability and the accuracy of a test result may be obviously affected by surface conditions of a material or positions of the testing points. Second, the traditional resilience testing is directed to a concrete member that has been formed and fixed. However, during resilience testing for a single unfixed inorganic non-metal plate test sample 20, the test sample will vibrate or move under collision of a resilience testing rod, and is lower in stability. The present disclosure can achieve stability during testing of a test sample, and has higher testing repeatability. Third, probes of an ultrasonic testing instrument for inorganic materials at present are larger in size, and are mainly directed to members of larger sizes. However, testing waveforms for a thinner inorganic non-metal plate 20 have a larger fluctuation. Moreover, the test sample is low in repeatability, and testing data is low in effectiveness. Fourth, a large batch of industrially produced inorganic non-metal plates 20 are subjected to sampling inspection proportionally in a traditional method, which has a certain boundedness to reflect the performance of a batch of inorganic non-metal plates 20, and the testing technology and process are tedious, the labor intensity of personnel is high, and the automation degree is low. The present disclosure effectively solves the above problems, improves the testing efficiency, and realizes fast and continuous mechanical property testing for a large number of inorganic non-metal plates 20.

The present disclosure further provides a storage medium. The storage medium stores a computer program which can be executed to implement the above-mentioned ultrasonic-resilience value testing method for an inorganic non-metal plate in the above embodiment, specifically as mentioned above.

In conclusion, according to the ultrasonic-resilience value testing apparatus and method for the inorganic non-metal plate, and the storage medium, the ultrasonic-resilience value testing apparatus for the inorganic non-metal plate includes the fixing mechanism, the testing mechanism and the control mechanism; the fixing mechanism is used for carrying and fixing the inorganic non-metal plate to be tested; the testing mechanism is used for performing ultrasonic-resilience value testing on the inorganic non-metal plate fixed on the fixing mechanism; and the control mechanism is in communication connection with the fixing mechanism and the testing mechanism, and is used for controlling the fixing mechanism and the testing mechanism to run. The ultrasonic-resilience value testing apparatus and method for the inorganic non-metal plate, and the storage medium disclosed by the present disclosure have the following effects: First, test samples are tested under constant conditions, and testing instruments are controlled by setting mechanical automation programs, so that the inorganic non-metal plate test samples are tested under stable and uniform conditions, which ensures the testing accuracy and the data effectiveness and avoids the influence of manual operations on the testing data. Second, due to integration of ultrasonic testing and resilience testing, the testing apparatus can perform automatic testing by preliminary position adjustment for the sample size, thereby reducing the labor intensity of operators and improving the material performance testing efficiency. Third, the testing apparatus is suitable for product quality inspection in an industrial production process of inorganic non-metal plates and big ceramic plates, and can realize automatic, continuous and fast non-destructive mechanical property testing and verification for the quality of a large batch of products.

It should be understood that the application of the present disclosure is not limited to the above-mentioned examples. Those of ordinary skill in the art can make improvements or transformations according to the above illustrations, and all these improvements and transformations shall fall within the protection scope of the claims appended.

What is claimed is:

1. An ultrasonic-resilience value testing apparatus for an inorganic non-metal plate, comprising:
a fixing mechanism configured to carry and fix an inorganic non-metal plate to be tested, wherein the fixing mechanism comprises a rotary lifting platform and a detachable inorganic non-metal cushion block is arranged on an upper surface of the rotary lifting platform; wherein the fixing mechanism further comprises a fixing cylinder component, the fixing cylinder component is arranged at an upper end of the rotary lifting platform, the rotary lifting platform and the fixing cylinder component are configured to move toward each other, the rotary lifting platform is configured to be liftable and rotatable and to carry the inorganic non-metal plate to be tested; the fixing cylinder component is connected with a cylinder and configured to press and fix the inorganic non-metal plate on the rotary lifting table; and an experiment module, the rotary lifting platform is fixed at a bottom of the experiment module, and the fixing cylinder component is mounted at a top of the experiment module;
a testing mechanism configured to perform ultrasonic-resilience value testing on the inorganic non-metal plate fixed on the fixing mechanism, wherein the testing mechanism comprises:
an ultrasonic testing component comprising:
an ultrasonic transmitter,
an ultrasonic receiver,
a first ultrasonic cylinder, and
a second ultrasonic cylinder wherein the ultrasonic transmitter is fixed on the first ultrasonic cylinder and the ultrasonic receiver is fixed on the second ultrasonic cylinder;
wherein the first ultrasonic cylinder and the second ultrasonic cylinder are fixed on left and right side walls of the experiment module, with centers located on a horizontal straight line, and the first ultrasonic cylinder and the second ultrasonic cylinder are configured to:
drive the ultrasonic transmitter and the ultrasonic receiver to move toward each other, and
drive the ultrasonic transmitter and the ultrasonic receiver to move along a vertical direction;
a controller configured to control both the fixing mechanism and the testing mechanism to measure the ultrasonic-resilience value.

2. The ultrasonic-resilience value testing apparatus for the inorganic non-metal plate according to claim 1, further comprising:
a resilience testing component which comprises:
a resiliometer,
a data acquirer, and
a crossed positioning sliding table wherein the resiliometer is arranged on the crossed positioning sliding table and is in communication connection to the data acquirer, the crossed positioning sliding table is arranged at a front upper end of a second ultrasonic cylinder and is configured to drive the resiliometer to move in a horizontal direction and a vertical direction.

3. The ultrasonic-resilience value testing apparatus for the inorganic non-metal plate according to claim 1, wherein the controller is arranged on one side of the experiment module and further comprises:
a control module configured to control pressure, switching of an air pump, and switching of the cylinders, and
a data processing module configured to collect testing data of a ultrasonic testing component and a resilience testing component and output test results.

4. An ultrasonic-resilience value testing method for an inorganic non-metal plate comprising:
receiving a corresponding size instruction of an inorganic non-metal plate to be tested;
replacing an inorganic non-metal cushion block of the corresponding size;
controlling a rotary lifting platform to rise up and drop down after the inorganic non-metal plate to be tested is horizontally placed on the rotary lifting platform to cause the inorganic non-metal plate to be located on the same horizontal line with a first ultrasonic cylinder and a second ultrasonic cylinder;
controlling a fixing cylinder component to press the inorganic non-metal plate to be tested;
controlling the first ultrasonic cylinder to drive an ultrasonic transmitter;
controlling the second ultrasonic cylinder to drive an ultrasonic receiver to be aligned with a position of a center point of a side edge of the inorganic non-metal plate to be tested in a thickness direction;
controlling the ultrasonic transmitter and the ultrasonic receiver to start to perform the ultrasonic-resilience value testing and collect ultrasonic testing data;
turning off the cylinders to cause the fixing cylinder component, the first ultrasonic cylinder, and the second ultrasonic cylinder to be reset;
controlling the rotary lifting platform to rise up to cause a side surface of the inorganic non-metal plate to be tested to be located on the same plane with a resiliometer;
controlling the fixed cylinder component to press the inorganic non-metal plate to be tested;
controlling the resiliometer to perform resilience testing on the center point of the side edge of the inorganic non-metal plate to be tested according to a preset rule and collect resilience value testing data, to return to the original position after the ultrasonic-resilience value testing is completed;
controlling a crossed positioning sliding table to drive the resiliometer to move to a next point to be tested till the ultrasonic-resilience value testing for the side surface is completed;
after the ultrasonic-resilience value testing is completed, controlling the fixed cylinder component to be reset, controlling the rotary lifting platform to rotate 90°;
controlling the fixed cylinder component to press the inorganic non-metal plate to be tested;
repeating the four prior controlling steps until resilience value testing data of four side surfaces of the inorganic non-metal plate is obtained;
obtaining ultrasonic testing data and resilience value testing data;
obtaining an ultrasonic data effective value and a resilience value effective value by means of data processing; and
obtaining a mechanical property reference value of the inorganic non-metal plate by means of conversion.

5. A non-transitory storage medium, wherein the non-transitory storage medium stores a computer program executed to implement an ultrasonic-resilience value testing method for the inorganic non-metal plate comprising:
receiving a corresponding size instruction of an inorganic non-metal plate to be tested;
replacing an inorganic non-metal cushion block of the corresponding size;
controlling a rotary lifting platform to rise up and drop down after the inorganic non-metal plate to be tested is horizontally placed on the rotary lifting platform to cause the inorganic non-metal plate to be located on the same horizontal line with a first ultrasonic cylinder and a second ultrasonic cylinder;
controlling a fixing cylinder component to press the inorganic non-metal plate to be tested;
controlling the first ultrasonic cylinder to drive an ultrasonic transmitter;
controlling the second ultrasonic cylinder to drive an ultrasonic receiver to be aligned with a position of a center point of a side edge of the inorganic non-metal plate to be tested in a thickness direction;
controlling the ultrasonic transmitter and the ultrasonic receiver to start to perform the ultrasonic-resilience value testing and collect ultrasonic testing data;
turning off the cylinders to cause the fixing cylinder component, the first ultrasonic cylinder, and the second ultrasonic cylinder to be reset;
controlling the rotary lifting platform to rise up to cause a side surface of the inorganic non-metal plate to be tested to be located on the same plane with a resiliometer;
controlling the fixed cylinder component to press the inorganic non-metal plate to be tested;
controlling the resiliometer to perform resilience testing on the center point of the side edge of the inorganic non-metal plate to be tested according to a preset rule and collect resilience value testing data, to return to the original position after the testing is completed;
controlling a crossed positioning sliding table to drive the resiliometer to move to a next point to be tested till the ultrasonic-resilience value testing for the side surface is completed;
after the ultrasonic-resilience value testing is completed, controlling the fixed cylinder component to be reset, controlling the rotary lifting platform to rotate 90°;
controlling the fixed cylinder component to press the inorganic non-metal plate to be tested;
repeating the four prior controlling steps until resilience value testing data of four side surfaces of the inorganic non-metal plate is obtained;
obtaining ultrasonic testing data and resilience value testing data;
obtaining an ultrasonic data effective value and a resilience value effective value by means of data processing; and
obtaining a mechanical property reference value of the inorganic non-metal plate by means of conversion.

* * * * *